United States Patent [19]
Lindem et al.

[11] 3,937,587
[45] Feb. 10, 1976

[54] ADJUSTABLE CUTTER TOOTH MOUNTING

[75] Inventors: Thomas J. Lindem; Jan Van Roojen, both of Rockford, Ill.

[73] Assignee: The Ingersoll Milling Machine Company, Rockford, Ill.

[22] Filed: July 5, 1974

[21] Appl. No.: 485,802

[52] U.S. Cl. .............................. 408/181; 408/153
[51] Int. Cl.² ..................... B23B 51/00; B23B 39/14
[58] Field of Search ........... 408/153, 154, 155, 181, 408/185; 33/164 B, 164 R

[56] References Cited
UNITED STATES PATENTS

| | | | |
|---|---|---|---|
| 2,125,005 | 7/1938 | Jearum | 33/164 B |
| 2,338,271 | 1/1944 | Ulanet | 33/164 B X |
| 3,518,738 | 7/1970 | Porter | 408/153 |
| 3,682,561 | 8/1972 | Lemery et al. | 408/153 |
| 3,709,625 | 1/1973 | Erkfritz | 408/181 |

*Primary Examiner*—Donald R. Schran
*Assistant Examiner*—W. R. Briggs
*Attorney, Agent, or Firm*—Wolfe, Hubbard, Leydig, Voit & Osann, Ltd.

[57] ABSTRACT

A mounting for supporting a cutter tooth in a boring bar for fine adjustment outwardly to compensate for tooth wear, the mounting including a cartridge insertable into a hole through the boring bar to support the tip of the cutter tooth in a cutting position with respect to the bar. The cartridge comprises a slidable holder connected by means of a differential screw to a nut so that, as the screw is turned, the length of the cartridge is increased to provide fine adjustment in the position of the cutter tooth. Coarse adjustment in the position of the cutter tooth is provided as an incident to assembling the parts of the cartridge by threading the screw into the nut until the lower end of the screw is flush with the lower end of the nut and by then mounting the holder on the upper end of the screw. Once assembled as a unit, the cartridge is inserted into the hole until an annular shoulder on the nut seats against a complimentary shoulder within the hole thereby accurately locating the cutter tooth so only fine adjustment is needed thereafter. In order for the mounting to be used in smaller diameter boring bars, one form of the invention utilizes a differential screw having interfitting male and female portions and, in the other form of the invention, a driver recess in the lower end portion of the screw permits the latter to be positioned essentially flush with the underside of the boring bar.

12 Claims, 11 Drawing Figures

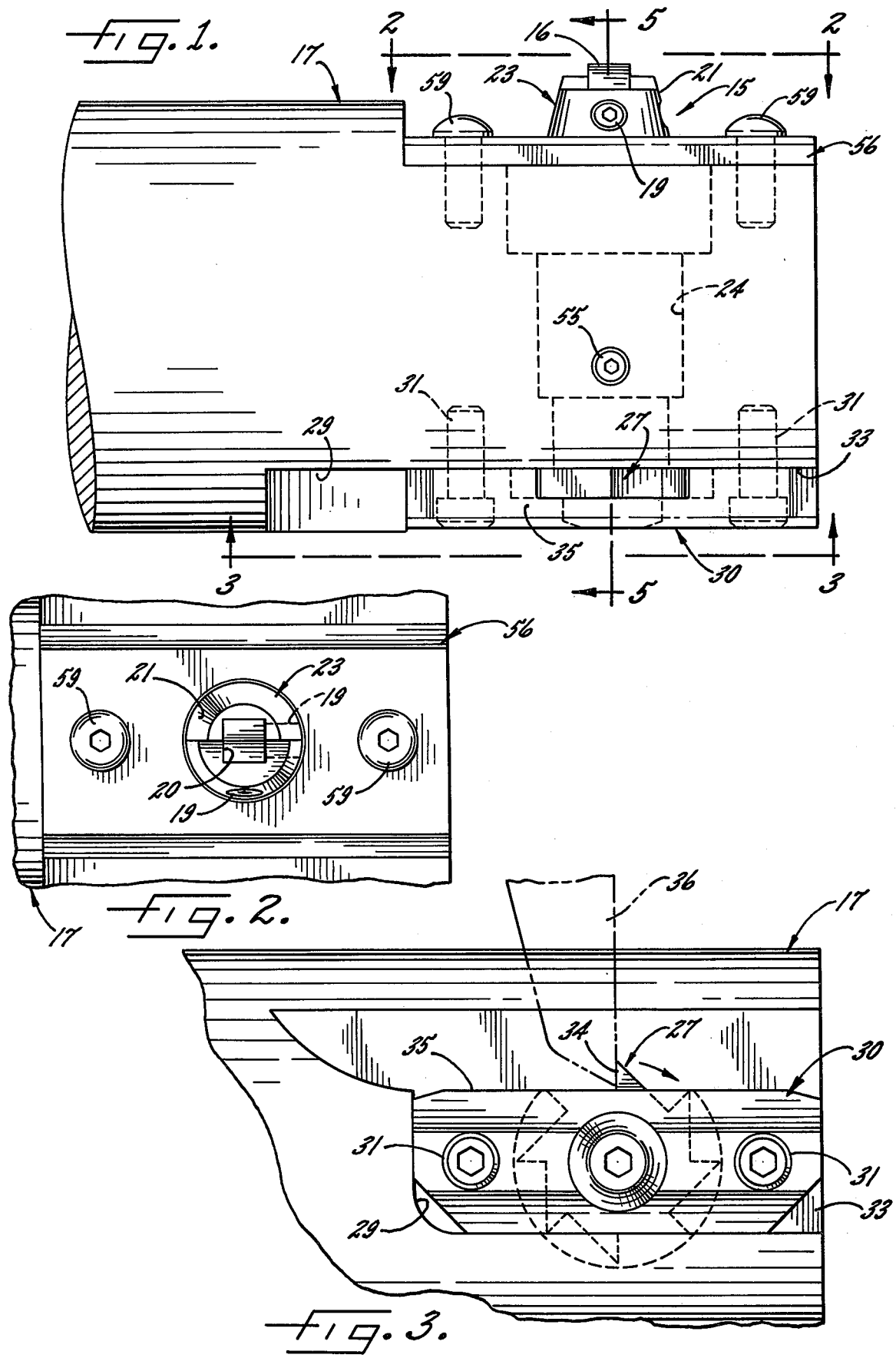

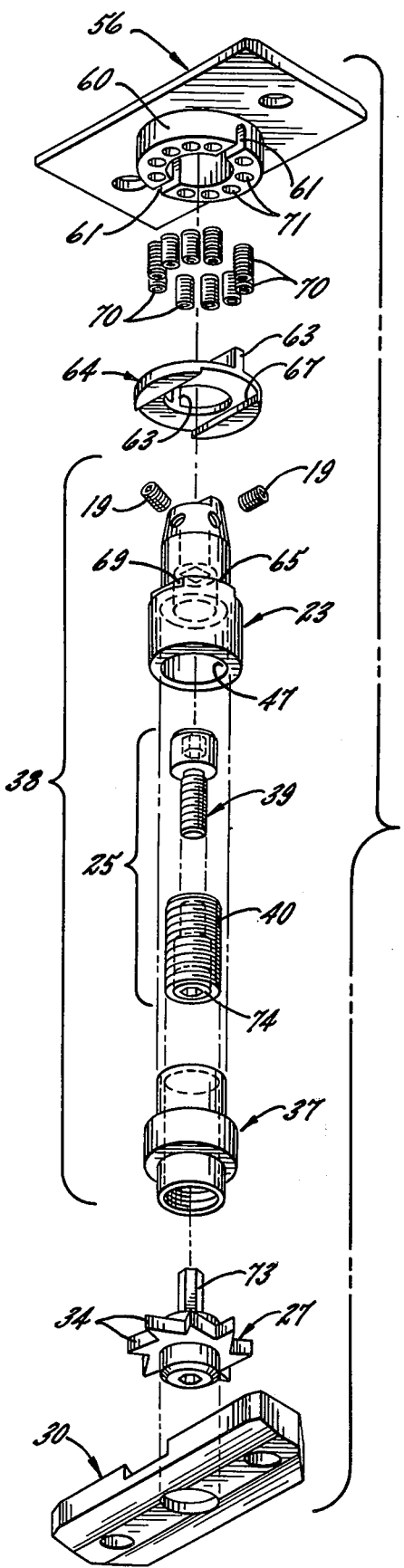
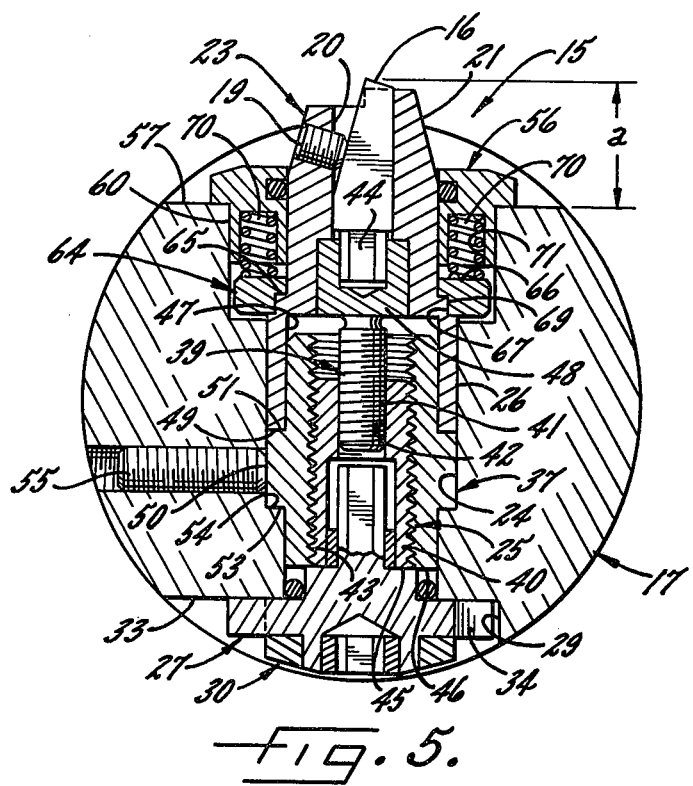
Fig. 4.
Fig. 5.
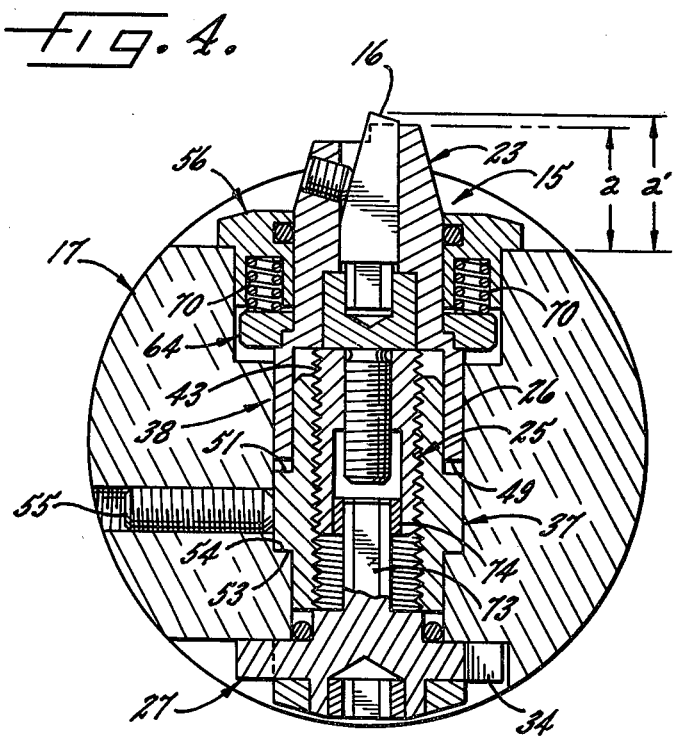
Fig. 6.

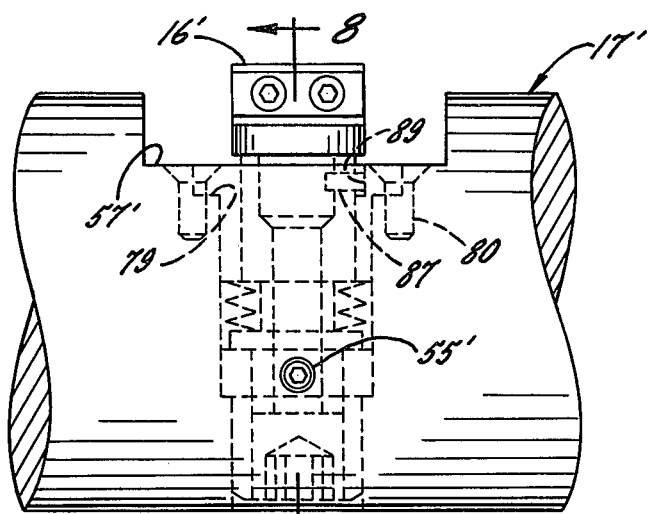
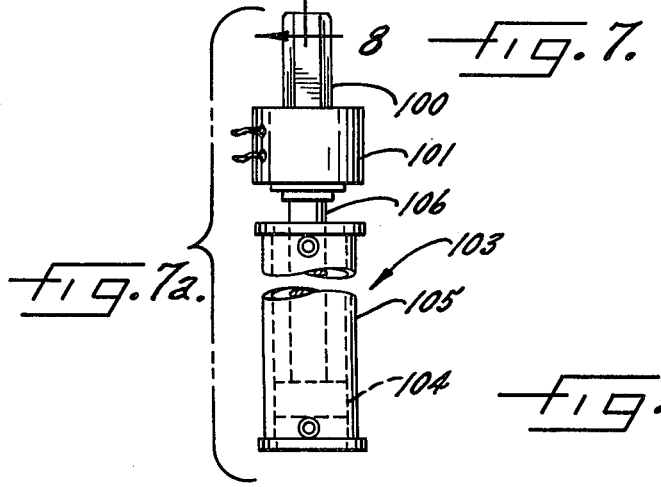
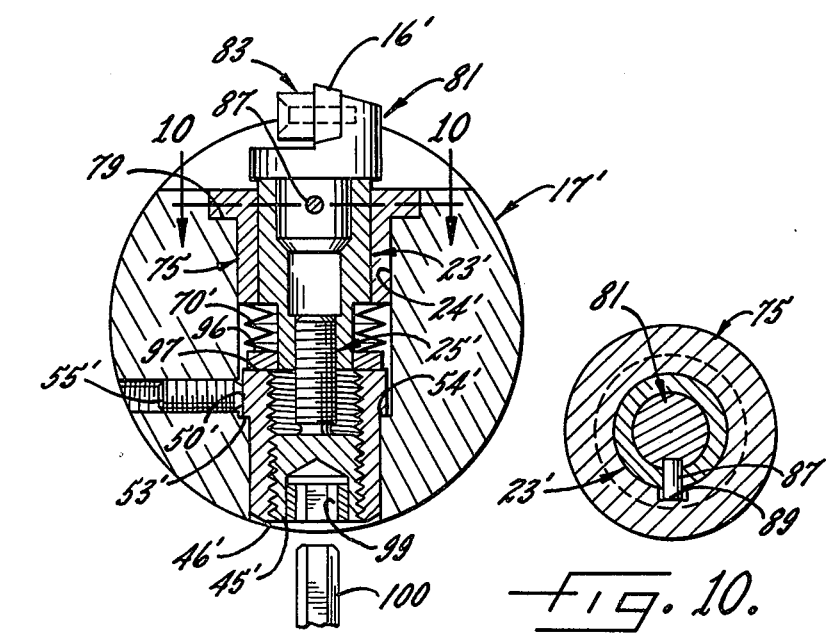
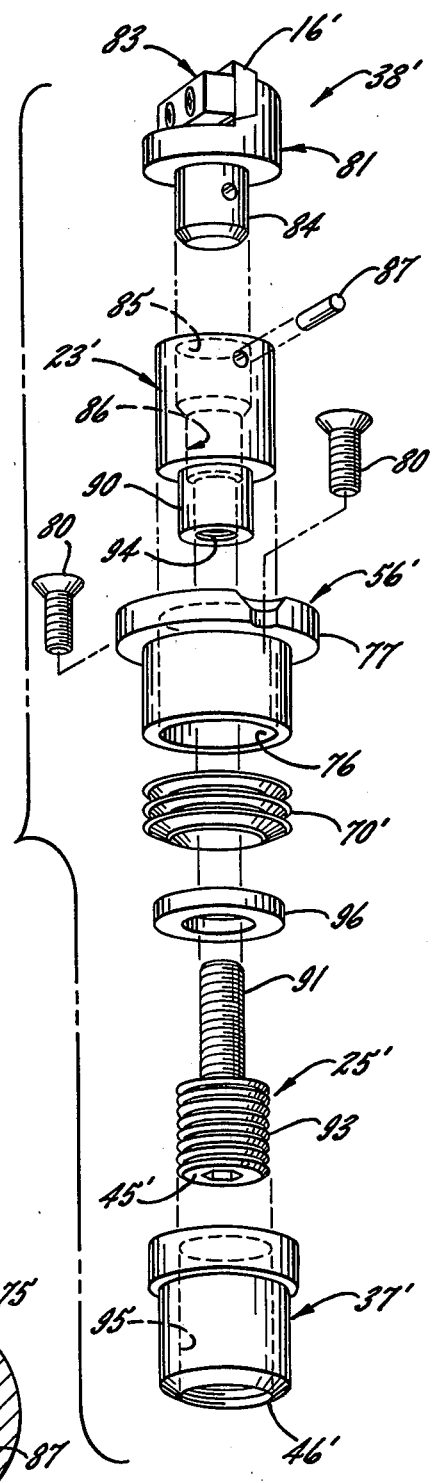

3,937,587

ADJUSTABLE CUTTER TOOTH MOUNTING

BACKGROUND OF THE INVENTION

This invention relates to an adjustable cutter tooth mounting such as is used in a boring bar to provide fine adjustment of the cutter tooth to compensate for wear of the tooth. More particularly, the invention relates to a cutter tooth mounting of the type which utilizes a differential screw to effect the fine adjustment of the cutter tooth.

Adjustable cutter tooth mountings of the foregoing type are disclosed in U.S. Pat. Nos. 3,635,572; 3,682,561 and 3,709,625.

SUMMARY OF THE INVENTION

The primary object of the present invention is to provide a cutter tooth mounting of the above general character which greatly simplifies the procedure of initially assembling the cutter tooth with a boring bar and which is adapted particularly for use within a boring bar whose diameter is smaller than the diameters of previously used boring bars. A more detailed object is to accomplish the foregoing by constructing the mounting to include a simple, compact and inexpensive cartridge enabling coarse adjustment of the cutter tooth to be made prior to insertion of the cartridge in the boring bar.

An additional object is to construct the cartridge so that the coarse adjustment of the cutter tooth may be made as an incident to assembling the parts of the cartridge.

A more detailed object is to provide a cartridge having unique means for positioning the cartridge in a predetermined axial position within the hole in the boring bar so that, when the cartridge is seated within the hole, the cutter tooth is automatically positioned for fine adjustment. Advantageously, the positioning means includes a nut adapted to receive one end portion of a differential screw in a coarsely adjusted position during assembly of the cartridge and prior to completing the assembly of the cartridge by securing a cutter tooth holder to the screw.

In one embodiment, the invention also resides in the utilization of a differential screw having interfitting, threaded male and female end portions to reduce the length of the cartridge without any loss in the range of fine adjustment so the cartridge may be used in a small diameter boring bar.

In another embodiment, the invention also resides in the provision of a novel recess within one end of the differential screw for receiving means adapted to turn the screw when making a fine adjustment in the position of the cutter tooth.

These and other objects and advantages of the present invention will become more apparent from the following detailed description when taken in conjunction with the accompanying drawings.

BRIEF DESCRIPTION OF THE DRAWINGS

FIG. 1 is a fragmentary elevational view showing a boring bar equipped with a cutter tooth mounting embodying the novel features of the present invention.

FIG. 2 is an enlarged fragmentary view taken substantially along line 2—2 of FIG. 1.

FIG. 3 is an enlarged fragmentary view taken substantially along line 3—3 of FIG. 1.

FIG. 4 is an exploded perspective view showing parts of the cutter tooth mounting.

FIG. 5 is a cross-sectional view taken substantially along line 5—5 of FIG. 1.

FIG. 6 is a cross-sectional view similar to FIG. 5 but showing movement of parts of the mounting on an exaggerated scale.

FIG. 7 is a fragmentary elevational view of an alternative embodiment of the present invention.

FIG. 7a is a fragmentary elevational view of a tool operable in conjunction with the mounting shown in FIG. 7 to adjust the cutter tooth outwardly in fine increments.

FIG. 8 is a fragmentary corss-sectional view taken substantially along line 8—8 of FIG. 7.

FIG. 9 is an exploded perspective view showing parts of the mounting shown in FIG. 7.

FIG. 10 is a fragmentary cross-sectional view taken substantially along line 10—10 of FIG. 8.

DETAILED DESCRIPTION OF THE PREFERRED EMBODIMENTS

As shown in the drawings for purposes of illustration, the present invention is embodied in a mounting 15 such as is used to support a cutter tooth 16 for fine incremental adjustment on a rotatable body such as a boring bar 17 to perform a finish boring operation on holes within a workpiece (not shown). As disclosed in the above-mentioned U.S. Pat. No. 3,682,561, the tip of the tooth projects radially from the bar to effect boring as the bar is rotated in the workpiece. Set screws 19 (see FIGS. 1 and 5) clamp the tooth within a socket 20 formed in the outer end portion 21 of a generally cylindrical holder 23 which is mounted in a diametrically extending hole 24 formed through the boring bar. The holder, in turn, is mounted slidably and non-rotatably within the hole for axial adjustment in fine increments on the order of 0.0001 to 0.0002 inches to compensate for wear of the tip of the tooth as a result of the boring.

As disclosed in U.S. Pat. No. 3,682,561, fine adjustment of the holder 23 is effected by turning a differential screw 25 (see FIGS. 3 and 5) which is disposed within the hole 24 and connected between the inner end portion 26 of the holder and a rotatable disk 27. The latter is held in an axially fixed position on the boring bar 17 diametrically opposite the tooth 16 and within a recess 29 by a plate 30 which is detachably secured to the bar and against the bottom 33 of the recess by screws 31. The disk is free to turn relative to the boring bar and serves to turn the screw so that the different screw pitches coact to transmit the disk motion to the holder at a greatly reduced rate as determined by the pitch differences. Herein, the disk 27 is in the form of a star wheel having a plurality of radially projecting teeth 34, at least one of which always is exposed beyond the edge 35 (see FIG. 3) of the plate for engagement by a stop or pawl 36. As disclosed in U.S. Pat. No. 3,682,561, the pawl is mounted on the boring machine and is moved back and forth at appropriate times to engage the tooth and turn the disk as an incident to withdrawing the boring bar from the workpiece.

The present invention contemplates construction of the mounting 15 in the form of a simple and compact cartridge 38 which is adapted particularly for use in a smaller diameter boring bar 17 and which greatly simplifies the procedure of initially installing the mounting and accurately positioning the cutter tooth 16 in the boring bar. For these purposes, a nut 37 is assembled together with the holder 23 and the differential screw 25 so as to form the cartridge and provide for coarse adjustment in the position of the cutter tooth prior to insertion of the cartridge into the hole 24 in the boring bar. Advantageously, the coarse adjustment in the position of the cutter tooth is achieved as an incident to assembling the parts of the cartridge by threading the holder, screw and nut together in predetermined axial positions with respect to each other so that, as the cartridge is inserted into the hole, means within the mounting locate the cartridge in a predetermined position within the hole. As a result, once the cartridge is secured in the boring bar, the tooth is positioned accurately with only fine adjustment of the tooth being needed thereafter.

In the form of the invention illustrated in FIGS. 1 through 6, compactness of the mounting 15 is achieved without any loss in the range of potential fine adjustment by constructing the differential screw 25 to include male and female portions 39 and 40 (see FIGS. 4 and 5). Herein, the male portion forms the outer end of the screw and includes an external thread 41 formed on the lower section of the male portion. An upper section 48 of the male portion is secured by a press fit in the holder 23 so the lower section extends in a generally axial direction with respect to the cartridge and into mating engagement with an internal thread 42 of the female portion which forms the inner end of the screw. The female portion also is provided with an external thread 43 and is threaded into the nut 37 so the holder, screw and nut are assembled together as a unit forming the cartridge 38. The external thread 43 of the female portion is of the same hand as but of a somewhat greater pitch than the internal thread 42. Thus, as the female portion is turned by the disk 27, the difference in the pitches of the two threads causes a greatly reduced axial movement of the holder in relation to the axial movement of the female portion thereby providing fine adjustment in the position of the cutter tooth 16. By virtue of the foregoing construction, the length of the mounting 15 may be reduced substantially without any corresponding loss in the range of fine adjustment provided by the screw 25. Thus, the exemplary mounting may be used in a boring bar whose diameter is substantially smaller than prior boring bars having generally similar cutter tooth mountings with the exemplary mounting still providing a full range of fine adjustment.

As shown in FIG. 6, the distance which the cutter tooth may be adjusted outwardly is represented by the exaggerated difference between the two distances $a$ and $a'$. To reposition the cutter tooth 16 after wear of the tooth has exceeded the limits for fine adjustment of the mounting 15, a set screw 44 is located in the inner end of the socket 20 in the upper section 48 of the differential screw 25. Herein, repositioning of the cutter tooth is accomplished by turning the female portion 40 of the differential screw back to its initial position as shown in FIG. 5 after the holder has been moved outwardly the full extent of its fine adjustment. Then, after removing the cutter tooth from the socket, the set screw may be turned axially outwardly to compensate for wear at the tip of the tooth to coarsely position the tip for further usage, the differential screw providing the fine adjustment to position the tip exactly as desired once the tooth is reclamped in the socket.

To provide coarse adjustment in the position of the cutter tooth 16 prior to insertion of the cartridge 38 into the hole 24 in the boring bar 17, the female portion 40 of the differential screw 25 is threaded into the nut 37 until inner end 45 of the female portion is flush with the inner end 46 of the nut (see FIG. 5). Then, the nut is telescoped into an annular recess 47 formed in the inner end portion of the holder and is turned to mate the internal thread 42 of the female portion with the external thread 41 of the male portion 39. Continued rotation of the nut causes the female portion of the differential screw to ride upwardly on the male portion until the inner end 49 of the holder abuts the upper edge 51 of an annular shoulder 50 formed on the outside of the nut thereby locating the tip of the cutter tooth 16 accurately with respect to the inner end 46 of the nut.

When the assembled cartridge 38 is inserted into the hole 24, the lower edge 53 of the shoulder 50 abuts a corresponding shoulder 54 formed on the inside of the hole and accurately positions the tip of the cutter tooth 16 with respect to the boring bar 17 without the need to make further coarse adjustment in the position of the tooth. The two shoulders 50 and 54 thus serve as the means for accurately positioning the cartridge 38 within the hole so that only fine adjustment is required to further position the tip of the cutter tooth. Moreover, with the nut 37 telescoped into the recess, the inner end portion 26 of the holder is captivated between the nut and the sides of the hole 24 so as to keep the holder from becoming loose and possibly wobbling from side-to-side within the hole when boring.

To secure the cartridge 38 within the hole 24 and against rotation, the nut 37 is held fixed against axial movement within the hole by a set screw 55 and a retaining member in the form of a plate 56 is telescoped over the outer end portion 21 of the holder 23. The plate is fastened within a recess 57 in the boring bar 17 adjacent the outer end of the hole by screws 59. Spline means including an inwardly extending collar section 60 integrally formed with the retaining plate serve to keep the holder from rotating within the hole. Herein, diametrical slots 61 (see FIG. 4) are formed in the collar and extend in generally radial directions with respect to the central axis of the holder to receive tongues 63 projecting outwardly from a washer 64. The latter is non-rotatably mounted on the holder intermediate the ends thereof by engagement with an annular shoulder 65 defined between the outer and inner end portions 21 and 26 of the holder. The tongues are generally rectangular in shape and extend outwardly from the upper face 66 of the washer while shoulders 67 are formed in and extend generally parallel with each other laterally across the washer. The washer shoulders engage opposing flats 69 formed in the shoulder 65 of the holder and thus keep the holder from turning relative to the washer. The latter, in turn, is kept from turning relative to the retaining plate by means of the interfitting tongues 63 and slots 61 so that, when the retaining plate is secured to the boring bar 17 within the recess 57, the holder is mounted to slide in an axial direction within the hole and yet is held against rotation.

As shown in FIGS. 4 and 5, the holder 23 is continuously urged axially in an inward direction within the hole 24 by a series of coil springs 70 compressed between the collar 60 and the washer 64. In this form of the invention, the springs are seated within angularly spaced holes 71 formed in the collar so as to engage the outer face 66 of the washer. Advantageously, this arrangement takes up any backlash which otherwise might occur between the mating threads 41 and 42 of the male and female portions 39 and 40 of the differential screw 25 or between the external thread 43 of the screw and the internal thread of the nut 37. As a result, the position of the cutter tooth 16 is fixed precisely relative to the central axis of the boring bar without the necessity of clamping the holder to the boring bar.

When the female portion 40 of the differential screw 25 is turned to make a fine adjustment outwardly in the position of the holder 23 and the cutter tooth 16, the female portion rides outwardly within the nut 37 a first distance with respect to the fixed position of the nut. At the same time, because the male portion 39 of the screw is fixed against rotation, the female portion rides outwardly over the male portion. As a result, instead of pushing the holder outwardly the same first distance that the female portion moves outwardly within the nut, the holder is moved outwardly a second distance equal to the first distance less a third distance represented by the distance the female portion rides outwardly over the male portion. The distance the holder is adjusted outwardly is shown in FIG. 6 as the difference between $a$ and $a'$ and is equal to the number of turns made by the female portion multiplied by the difference between the pitches of the internal and external threads 42 and 43 of the female portion.

Herein, turning of the female portion 40 is effected through the star wheel 27 by means of a driver shaft 73 extending outwardly into the hole 24 from the center of the wheel. In cross section, the shaft is generally hexagonal in shape and mates slidably with a similarly shaped sleeve 74 which is fixed within the lower end of the female portion by a press fit. Accordingly, when the star wheel is turned through a preselected angle, the female screw is turned through the same angle to move the holder outwardly in a fine incremental adjustment.

In an alternative form of the invention illustrated in FIGS. 7 through 10, parts corresponding to those of the first form of the invention are indicated by the same but primed reference numerals. Herein, the cartridge 38' comprises a retaining member 56' in the form of a generally cylindrical collar having an axial opening 76 into which is telescoped a holder 23' for a cutter tooth 16'. An annular flange 77 projects radially outward from the upper end portion of the collar 56' and seats within a recess 79 formed in the boring bar 17' around the upper end of the hole 24'. Screws 80 which are spaced angularly from each other around the flange serve to clamp the collar within the hole and thus retain the cartridge in the boring bar. The holder is free to be slid axially within the collar for fine adjustment in the position of the tip of the cutter tooth.

As shown in FIGS. 8 and 9, the cutter tooth 16' is secured to a head 81 by a clamp 83. In turn, the head includes a generally cylindrical lower portion 84 which is telescoped into the enlarged upper end portion 85 of a hole 86 extending through the holder and is held within the holder by a press fit. In addition, a pin 87 projects radially outward from the side of the head, extends through the holder and mates with a slightly elongated slot 89 (see FIGS. 7 and 10) formed in the inside wall of the collar 23'. This arrangement provides spline means whereby the head and holder are held fixed together with the holder being held securely within the collar against rotation and yet being free to be slid axially within the collar for fine adjustment in the position of the cutter tooth.

For fine outward adjustment in the position of the cutter tooth 16', a differential screw 25' is connected between the lower end portion 90 of the holder 23' and a nut 37' which is secured within the lower end portion of the hole 24'. Herein, the screw includes inner and outer threaded sections 91 and 93 formed on a common shank. The outer section is mated with a threaded section 94 formed in the lower end portion of the hole 86 extending through the holder while the inner end section is mated with the internal thread 95 of the nut. As in the first described form of the invention, the two threaded sections of the differential screw are of the same hand but of different pitches, the pitch of the inner section being slightly greater than the pitch of the outer section to provide fine adjustment in the position of the cutter tooth as the screw is turned.

To eliminate backlash between the respective mating threads 94, 91 and 93, 95 of the holder 23', screw 25' and nut 37' in this form of the invention, a washer 96 is fixed on the lower end portion 90 of the holder and stacked Belleville springs 70' act in compression between the collar 56' and the washer. In this way, the holder is continuously urged endwise away from the upper end of the hole 24' so the lower face of the holder thread 94 engages the upper face of the screw thread 91 and the upper face of the nut thread 95 engages the lower face of the screw thread 93 to eliminate lash between the mating threads during outward adjustment of the cutter tooth 16'.

As in the first form of the invention, coarse adjustment in the positioning of the cutter tooth 16' is achieved prior to inserting the cartridge 38' into the hole 24' in the boring bar 17' by first threading the differential screw 25' into the nut 37' so the lower end 45' of the screw is flush with the lower end 46' of the nut. Then, the holder 23' is assembled with the collar 56' and is threaded onto the upper section 91 of the screw until the washer 96 abuts the upper surface 97 of the nut 37'. To mount the cartridge in the hole, the assembled cartridge is then turned to position the collar so the screws 80 may be threaded into the boring bar to clamp the cartridge within the hole. An annular shoulder 37' formed on the outside of the nut intermediate the opposite ends thereof positions the cartridge accurately within the hole by engagement with a corresponding shoulder 54' formed in the side of the hole 24' adjacent the lower end thereof. A set screw 55' is used to hold the nut securely in place once the cartridge is located within the hole.

Advantageously, in this form of the invention, a novel means to effect turning of the differential screw 25' for fine outward adjustment enables the lower end 45' of the screw to be positioned virtually flush with the lower end of the hole 24' so that the mounting 15' also may be used in a smaller diameter boring bar 17'. As shown in FIGS. 7 and 8, the screw is provided with a driver recess 99 in the lower end portion thereof. In the present instance, the recess is generally hexagonal in cross section to receive a similarly shaped driver 100 (see FIG. 7a) but it will be appreciated that other shapes would serve equally well. While the driver may be operated manually, automatic fine adjustment may be achieved by advancing the driver into the recess from beneath the boring bar and turning the driver through a preselected angle such as by means of a stepping motor 101 (FIG. 7a) while the boring bar rests in its retracted position between steps in the performance of a boring operation on a workpiece. Movement of the driver may be effected by a reversible actuator 103 in the form of a piston 104 which is slidable within a cylinder 105. Under the control of suitable mechanism generally similar to that shown in U.S. Pat. No. 3,457,811, actuation of the motor and reciprocation of a piston rod 106 may be effected during the proper times in the cycle of the boring machine to provide fine incremental outward adjustment in the position of the cutter tooth.

Thus, it will be apparent from the foregoing that the mounting 15 of the present invention advantageously is adapted for use in a samller diameter boring bar 17 while still providing a wide range of fine adjustment outwardly for positioning the cutter tooth 16 to compensate for wear. Moreover, by virtue of the unique construction of the cartridge 38, the initial set up and positioning of the cutter tooth in the boring bar is greatly simplified. This is because coarse adjustment in positioning the cutter tooth is accomlished as an incident to the assembly of the cartridge so that, when the cartridge is inserted into the hole 24 in the boring bar, the tooth is positioned accurately with only fine adjustment being needed thereafter.

We claim as our invention:

1. A mounting for supporting a cutter tooth for adjustment in fine increments having, in combination, a rotatable body with a hole extending therethrough, said hole having an upper end portion of a predetermined diameter, a cartridge having a maximum diameter slightly less than said predetermined diameter and a length adjustable outwardly a limited distance in fine increments from an initial preselected length, said cartridge in its initial length being telescoped into said hole from the upper end thereof and including a holder disposed within and slidably guided along said upper end portion of said hole, said tooth being secured to the outer end of said holder and providing a tip for cutting engagement with a workpiece during rotation of said body, means securing said holder within said hole against rotation so as to hold said tip at a preselected angular orientation with respect to said body while permitting the holder to be slid axially within said hole in fine increments to adjust the position of said tooth to keep said tip at a predetermined radial distance from the axis of rotation of said body, a nut mounted within said hole and being secured against movement within said hole, and a differential screw with one end portion threaded into said nut and being initially set in a predetermined position with respect to said nut during assembly of said cartridge, said screw having an opposite end portion connected to said holder after positioning of said one end portion so said cartridge is of said preselected length and may be rotated to position said tip within said preselected orientation prior to inserting the cartridge within the hole, means for locating said cartridge in a predetermined axial position within said hole as an incident to mounting the cartridge in the hole so as to position the tip of said tooth initially for cutting without need of substantial fine incremental adjustment regardless of the rotation required of said cartridge in positioning said tip at said preselected orientation, and means connecting with said one end portion of said screw for turning said screw within said nut from the end of said cartridge opposite the tooth to adjust the holder in fine increments in an axial direction with respect to said hole.

2. A mounting as defined by claim 1 wherein said locating means includes a shoulder formed in the side of said hole a predetermined distance from the inner end thereof, a corresponding shoulder integrally formed with the side of said nut and seated against the shoulder in said hole to locate said nut in said predetermined axial position.

3. A mounting as defined by claim 2 wherein said securing means includes a retaining member telescoped over the outer end portion of said holder and secured to said rotatable body, and spline means acting between said plate and said holder so as to permit said holder to slide axially within said hole while preventing rotation of the holder within said body.

4. A mounting as defined by claim 3 wherein said spline means includes a collar section integrally formed with said plate and extending into said hole around said holder, a slot formed in said collar section and extending in a generally axial direction with respect to said hole, a tongue non-rotatably connected with said holder and extending in an axial direction with respect to said hole and into said slot to keep said holder from rotating within said hole.

5. A mounting as defined by claim 4 wherein said holder includes an outer end portion of a predetermined diameter, an inner end portion whose diameter is larger than the diameter of said outer end portion, and an annular shoulder extending in a generally radial direction between said two end portions, a washer telescoped over said outer end portion and into abutting engagement with said shoulder, a first flat formed on one side of said inner end portion within said shoulder, a corresponding second flat formed on the underside of said washer and engaging said first flat to keep said washer from turning on said holder, said tongue being integrally formed with the other side of said washer and projecting into the slot formed in said collar whereby said holder is kept from rotating within said hole.

6. A mounting as defined by claim 3 wherein said differential screw includes a female section mounted within said nut and defining the inner end portion of said screw, internal and external threads formed on said female section, said external thread mating with the thread of said nut and having a pitch greater than the pitch of said internal thread, a threaded male section fixed to said holder, extending therefrom into said female section and mating with said internal thread for axial movement of said holder in fine increments when said female section is turned within said nut.

7. A mounting as defined by claim 6 including a recess formed in the inner end portion of said holder, said nut having an outer end portion slidably received within said recess.

8. A mounting as defined by claim 7 including means for turning said screw mounted on said rotatable body opposite said cutter tooth, said means including a wheel mounted on said body opposite said cutter tooth, a driver shaft integrally formed with said wheel and extending axially into said hole, and a retaining member fastened to said body to support said wheel rotatably on said body, a driver recess formed in the inner end portion of said screw, said shaft being slidably coupled with said recess whereby rotation of said wheel turns said screw.

9. A mounting as defined by claim 3 wherein said differential screw includes a first external thread formed on the inner end portion of said screw and mating with the internal thread of said nut, a second external thread formed on the outer end portion of said screw and having a pitch less than the pitch of said first thread, a threaded recess formed in the inner end portion of said holder, said outer end portion of said screw being mated with said recess in said holder so as to move said holder axially in fine increments when said screw is turned within said nut.

10. A mounting as defined by claim 9 wherein said differential screw includes a driver recess formed in the inner end portion thereof.

11. A mounting for supporting a cutter tooth for adjustment in fine increments having, in combination, a rotatable body with a hole extending therethrough, a cartridge telescoped into said hole from one end thereof and adapted for coarse adjustment of the cutter tooth prior to being inserted into the hole, said cartridge including a holder disposed within and slidably guided along said one end portion of said hole, said tooth being secured to the outer end of said holder and providing a tip for cutting engagement with a workpiece during rotation of said body, means securing said holder within said hole against rotation while permitting the holder to be slid axially in fine increments to adjust the position of said tooth, a nut mounted within said hole and being secured against movement within said hole and a differential screw including a female portion having an external thread of a predetermined pitch and an internal thread whose pitch is less than said predetermined pitch, said female portion initially being threaded in said nut to a predetermined position during assembly of said cartridge, said screw having a male portion fixed to said holder and having an external thread mated with the internal thread of said female portion, means connected with said female portion of said screw for turning said female portion within said nut from the end of said cartridge opposite the tooth to adjust the holder in fine increments in an axial direction with respect to said hole, and abutting means on said nut and within said hole for locating said nut in a predetermined axial position within said hole said cartridge being insertable into said hole only from the end of the hole from which the cutter projects.

12. A mounting for supporting a cutter tooth for adjustment in fine increments having, in combination, a rotatable body with a hole extending therethrough, a cartridge telescoped into said hole from one end thereof and adapted for coarse adjustment of the cutter tooth prior to being inserted into the hole, said cartridge including a holder disposed within and slidably guided along said one end portion of said hole, said tooth being secured to the outer end of said holder and providing a tip for cutting engagement with a workpiece during rotation of said body, means securing said holder within said hole against rotation while permitting the holder to be slid axially in fine increments to adjust the position of said tooth, a nut mounted within said hole and being secured against movement within said hole and a differential screw including a first thread of predetermined pitch mated with said nut initially in a predetermined position within said nut during assembly of said cartridge and a second thread whose pitch is less than said predetermined pitch, said holder having an internally threaded recess formed in the inner end portion thereof and mating with said second thread, a driver recess formed in the inner end portion of said screw to receive a driver for turning said screw to adjust the holder in fine increments in an axial direction with respect to said hole, and abutting means on said nut and within said hole for locating said nut in a predetermined axial position within said hole, said cartridge being insertable into said hole only from the end of the hole from which the cutter projects.

* * * * *